(12) United States Patent
Kerrison et al.

(10) Patent No.: US 7,516,208 B1
(45) Date of Patent: Apr. 7, 2009

(54) EVENT DATABASE MANAGEMENT METHOD AND SYSTEM FOR NETWORK EVENT REPORTING SYSTEM

(75) Inventors: Adam Geoffrey Kerrison, Esher (GB); Andrew Jonathan Bennett, London (GB); Kristian Jon Stewart, London (GB); Nicholas S. Banyard, Woking (GB)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 09/910,676

(22) Filed: Jul. 20, 2001

(51) Int. Cl.
*G06F 15/173* (2006.01)
*G06F 17/00* (2006.01)

(52) U.S. Cl. .................... 709/224; 709/202; 707/104.1; 707/201

(58) Field of Classification Search ................. 379/134, 379/32.01, 32.02; 707/10, 8, 104.1, 201; 709/201–203, 206, 207, 223–225
See application file for complete search history.

(56) References Cited

U.S. PATENT DOCUMENTS

| | | |
|---|---|---|
| 3,855,456 A | 12/1974 | Summers et al. |
| 3,906,454 A | 9/1975 | Martin |
| 4,135,662 A | 1/1979 | Dlugos |
| 4,410,950 A | 10/1983 | Toyoda et al. |
| 4,438,494 A | 3/1984 | Budde et al. |
| 4,503,534 A | 3/1985 | Budde et al. |
| 4,503,535 A | 3/1985 | Budde et al. |
| 4,517,468 A | 5/1985 | Kemper et al. |
| 4,545,013 A | 10/1985 | Lyon et al. |
| 4,568,909 A | 2/1986 | Whynacht |
| 4,585,975 A | 4/1986 | Wimmer |
| 4,591,983 A | 5/1986 | Bennett et al. |
| 4,622,545 A | 11/1986 | Atkinson |
| 4,648,044 A | 3/1987 | Hardy et al. |
| 4,727,545 A | 2/1988 | Glackemeyer et al. |

(Continued)

FOREIGN PATENT DOCUMENTS

EP 0 209 795 1/1987

(Continued)

OTHER PUBLICATIONS

Communication Relating to the Results of the Partial International Search with respect to International Application No. PCT/GB02/03095.

(Continued)

*Primary Examiner*—David Lazaro
(74) *Attorney, Agent, or Firm*—Seth H. Ostrow; Dreier LLP

(57) ABSTRACT

Improved and more efficient techniques are described for reducing the amount of work that needs to be performed by a database in a computer network in order to distribute event summary data to a large number of administrator clients. Delays experienced by event data at a database, e.g., due to delays in accessing a database, are reduced so that client can be notified of the events as soon as possible. Furthermore, event data obtained from both local and remote networks is efficiently coordinated using replica and union processes. Each monitoring location in the network includes both locally generated events, and a copy of remotely-generated events which are provided and maintained by one or more remote monitoring locations. The monitoring locations update one another with their event data.

24 Claims, 7 Drawing Sheets

U.S. PATENT DOCUMENTS

| | | |
|---|---|---|
| 4,817,092 A | 3/1989 | Denny |
| 4,823,345 A | 4/1989 | Daniel et al. |
| 4,866,712 A | 9/1989 | Chao |
| 4,881,230 A | 11/1989 | Clark et al. |
| 4,914,657 A | 4/1990 | Walter et al. |
| 4,932,026 A | 6/1990 | Dev et al. |
| 4,935,876 A | 6/1990 | Hanatsuka |
| 5,063,523 A | 11/1991 | Vrenjak .................... 364/514 |
| 5,107,497 A | 4/1992 | Lirov et al. |
| 5,109,486 A | 4/1992 | Seymour |
| 5,123,017 A | 6/1992 | Simpkins et al. |
| 5,125,091 A | 6/1992 | Staas, Jr. et al. |
| 5,133,075 A | 7/1992 | Risch |
| 5,159,685 A | 10/1992 | Kung |
| 5,179,556 A | 1/1993 | Turner |
| 5,204,955 A | 4/1993 | Kagei et al. |
| 5,214,653 A | 5/1993 | Elliott, Jr. et al. |
| 5,247,517 A | 9/1993 | Rose et al. |
| 5,261,044 A | 11/1993 | Dev et al. |
| 5,293,629 A | 3/1994 | Conley et al. |
| 5,295,244 A | 3/1994 | Dev et al. |
| 5,309,448 A | 5/1994 | Bouloutas et al. |
| 5,321,837 A | 6/1994 | Daniel et al. |
| 5,375,070 A | 12/1994 | Hershey et al. |
| 5,432,934 A | 7/1995 | Levin et al. |
| 5,436,909 A | 7/1995 | Dev et al. |
| 5,483,637 A | 1/1996 | Winokur et al. |
| 5,485,455 A | 1/1996 | Dobbins et al. |
| 5,491,694 A | 2/1996 | Oliver et al. |
| 5,495,470 A | 2/1996 | Tyburski et al. |
| 5,504,921 A | 4/1996 | Dev et al. |
| 5,521,910 A | 5/1996 | Matthews |
| 5,528,516 A | 6/1996 | Yemini et al. |
| 5,559,955 A | 9/1996 | Dev et al. |
| 5,590,120 A | 12/1996 | Vaishnavi et al. |
| 5,627,819 A | 5/1997 | Dev et al. |
| 5,646,864 A | 7/1997 | Whitney ................ 364/514 B |
| 5,649,103 A | 7/1997 | Datta et al. |
| 5,655,081 A | 8/1997 | Bonnell et al. |
| 5,664,220 A | 9/1997 | Itoh et al. .................. 395/826 |
| 5,666,481 A | 9/1997 | Lewis .................... 395/182.02 |
| 5,673,264 A | 9/1997 | Hamaguchi ................ 370/397 |
| 5,675,741 A | 10/1997 | Aggarwal et al. |
| 5,687,290 A | 11/1997 | Lewis |
| 5,696,486 A | 12/1997 | Poliquin et al. |
| 5,706,436 A | 1/1998 | Lewis et al. |
| 5,722,427 A | 3/1998 | Wakil et al. |
| 5,727,157 A | 3/1998 | Orr et al. |
| 5,734,642 A | 3/1998 | Vaishnavi et al. |
| 5,748,781 A | 5/1998 | Datta et al. |
| 5,751,933 A | 5/1998 | Dev et al. |
| 5,751,965 A | 5/1998 | Mayo et al. |
| 5,754,532 A | 5/1998 | Dev et al. |
| 5,764,955 A | 6/1998 | Doolan |
| 5,768,501 A | 6/1998 | Lewis |
| 5,777,549 A | 7/1998 | Arrowsmith et al. |
| 5,790,546 A | 8/1998 | Dobbins et al. |
| 5,791,694 A | 8/1998 | Fahl et al. |
| 5,793,362 A | 8/1998 | Matthews et al. |
| 5,812,750 A | 9/1998 | Dev et al. |
| 5,822,305 A | 10/1998 | Vaishnavi et al. |
| 5,832,503 A | 11/1998 | Malik et al. |
| 5,872,911 A | 2/1999 | Berg .................... 395/183.19 |
| 5,872,928 A | 2/1999 | Lewis et al. |
| 5,872,931 A | 2/1999 | Chivaluri |
| 5,889,953 A | 3/1999 | Thebaut et al. |
| 5,903,893 A * | 5/1999 | Kleewein et al. .............. 707/10 |
| 5,907,696 A | 5/1999 | Stilwell et al. |
| 5,940,376 A | 8/1999 | Yanacek et al. |
| 5,941,996 A | 8/1999 | Smith et al. .................... 714/47 |
| 5,970,984 A | 10/1999 | Wakil et al. |
| 5,980,984 A | 11/1999 | Modera et al. |
| 5,987,442 A | 11/1999 | Lewis et al. |
| 6,000,045 A | 12/1999 | Lewis |
| 6,003,090 A | 12/1999 | Puranik et al. |
| 6,006,016 A | 12/1999 | Faigon et al. .......... 395/185.01 |
| 6,014,697 A | 1/2000 | Lewis et al. |
| 6,026,442 A | 2/2000 | Lewis et al. |
| 6,041,383 A | 3/2000 | Jeffords et al. |
| 6,047,126 A | 4/2000 | Imai .......................... 395/710 |
| 6,049,828 A | 4/2000 | Dev et al. |
| 6,057,757 A | 5/2000 | Arrowsmith et al. |
| 6,064,304 A | 5/2000 | Arrowsmith et al. |
| 6,064,986 A | 5/2000 | Edelman |
| 6,064,996 A | 5/2000 | Yamaguchi et al. |
| 6,084,858 A | 7/2000 | Matthews et al. |
| 6,115,362 A | 9/2000 | Bosa et al. |
| 6,131,112 A | 10/2000 | Lewis et al. ................ 709/207 |
| 6,138,122 A | 10/2000 | Smith et al. |
| 6,141,720 A | 10/2000 | Jeffords et al. |
| 6,170,013 B1 | 1/2001 | Murata ..................... 709/229 |
| 6,185,613 B1 * | 2/2001 | Lawson et al. .............. 709/224 |
| 6,199,172 B1 | 3/2001 | Dube et al. |
| 6,205,563 B1 | 3/2001 | Lewis |
| 6,209,033 B1 | 3/2001 | Datta et al. |
| 6,216,168 B1 | 4/2001 | Dev et al. |
| 6,233,623 B1 | 5/2001 | Jeffords et al. |
| 6,243,747 B1 | 6/2001 | Lewis et al. |
| 6,253,211 B1 | 6/2001 | Gillies et al. |
| 6,255,943 B1 | 7/2001 | Lewis et al. ................. 340/506 |
| 6,324,530 B1 | 11/2001 | Yamaguchi et al. |
| 6,324,590 B1 | 11/2001 | Jeffords et al. |
| 6,336,138 B1 | 1/2002 | Caswell et al. |
| 6,341,340 B1 * | 1/2002 | Tsukerman et al. ......... 711/150 |
| 6,349,306 B1 | 2/2002 | Malik et al. |
| 6,359,976 B1 * | 3/2002 | Kalyanpur et al. .......... 379/134 |
| 6,373,383 B1 | 4/2002 | Arrowsmith et al. |
| 6,374,293 B1 | 4/2002 | Dev et al. |
| 6,381,639 B1 | 4/2002 | Thebaut et al. |
| 6,392,667 B1 | 5/2002 | McKinnon et al. |
| 6,421,719 B1 | 7/2002 | Lewis et al. |
| 6,430,712 B2 | 8/2002 | Lewis |
| 6,437,804 B1 | 8/2002 | Ibe et al. |
| 6,502,079 B1 | 12/2002 | Ball et al. |
| 6,510,478 B1 | 1/2003 | Jeffords et al. |
| 6,603,396 B2 | 8/2003 | Lewis et al. |
| 6,651,062 B2 | 11/2003 | Ghannam et al. |
| 6,799,209 B1 * | 9/2004 | Hayton ..................... 709/223 |
| 2001/0013107 A1 | 8/2001 | Lewis |
| 2001/0042139 A1 | 11/2001 | Jeffords et al. |
| 2001/0047409 A1 | 11/2001 | Datta et al. |
| 2001/0047430 A1 | 11/2001 | Dev et al. |
| 2001/0052085 A1 | 12/2001 | Dube et al. |
| 2002/0032760 A1 | 3/2002 | Matthews et al. |
| 2002/0050926 A1 | 5/2002 | Lewis et al. |
| 2002/0075882 A1 | 6/2002 | Donis et al. |
| 2002/0184528 A1 | 12/2002 | Shevenell et al. |
| 2002/0188584 A1 | 12/2002 | Ghannam et al. |
| 2003/0110396 A1 | 6/2003 | Lewis et al. |

FOREIGN PATENT DOCUMENTS

| | | |
|---|---|---|
| EP | 0 319 998 B1 | 6/1989 |
| EP | 0 338 561 B1 | 10/1989 |
| EP | 0 342 547 B1 | 11/1989 |
| EP | 0 616 289 | 9/1994 |
| EP | 0 686 329 B1 | 12/1995 |
| WO | WO 89/07377 | 8/1989 |
| WO | WO 93/00632 | 1/1993 |
| WO | WO 95/20297 | 7/1995 |
| WO | WO 96/09707 | 3/1996 |
| WO | WO 96/31035 | 10/1996 |
| WO | WO 97/16906 | 5/1997 |
| WO | WO 97/29570 | 8/1997 |

| | | |
|---|---|---|
| WO | WO 97/37477 | 10/1997 |
| WO | WO 97/44937 | 11/1997 |
| WO | WO 98/42109 | 9/1998 |
| WO | WO 98/44682 | 10/1998 |
| WO | WO 98/52322 | 11/1998 |
| WO | WO 99/27682 | 6/1999 |
| WO | PCT/US99/31135 | 12/1999 |
| WO | WO 00/13112 | 3/2000 |
| WO | WO 00/72183 | 11/2000 |
| WO | WO 01/47187 A3 | 6/2001 |
| WO | WO 01/86380 | 11/2001 |
| WO | WO 01/86443 | 11/2001 |
| WO | WO 01/86444 | 11/2001 |
| WO | WO 01/86775 | 11/2001 |
| WO | WO 01/86844 | 11/2001 |
| WO | WO 02/06971 | 1/2002 |
| WO | WO 02/06972 | 1/2002 |
| WO | WO 02/06973 | 1/2002 |

OTHER PUBLICATIONS

Subramanian, Mani, Network Management: Principles and Practice, Addison Wesley Longman, 2000.

Lewis, Lundy, Service Level Management for Enterprise Networks, Artech House, 1999.

Integrated Network Management V: Integrated Management in a Virtual World, Proceedings of the Fifth IFIP/IEEE International Symposium on Integrated Network Management, San Diego, California, May 12-16, 1997, Lazar A. et al, eds., Chapman & Hall, 1997.

Stevenson Douglas W., Network Management: What it is and what it isn't, Apr. 1995, http://www.sce.carleton.ca/netmanage/NetMngmnt/NetMngmnt.html (visited Aug. 30, 2004).

Network and Distributed Systems Management, Morris Sloman, Ed., Addison-Wesley, 1994.

RFC 1158—Management Information Base for network management of TCP/IP-based internets: MIB-II, Network Working Group, M. Rose, Ed., May 1990, http://www.faqs.org/rfcs/rfc1158.html (visited Aug. 30, 2004).

RFC 1157—Simple Network Management Protocol (SNMP), Network Working Group, J. Case et al., Eds., May 1990, http://www.faqs.org/rfcs/rfc1157.html (visited Aug. 30, 2004).

RFC 1156—Management Information Base for network management of TCP/IP-based internets, Network Working Group, K. McCloghrie and M. Rose, Eds., May 1990, http://www.faqs.org/rfcs/rfc1156.html (visited Aug. 30, 2004).

RFC 1155—Structure and identification of management information for TCP/IP-based internets, Network Working Group, M. Rose and K. McCloghrie, Eds., May 1990, http://www.faqs.org/rfcs/rfc1155.html (visited Aug. 30, 2004).

ISO/IEC 10164-1: 1993, Information technology—Open Systems Interconnection—Systems Management: Object Management Function.

ISO/IEC 10164-2:1993, Information technology—Open Systems Interconnection—Systems Management: State Management Function.

ISO/IEC 10164-4:1992, Information technology—Open Systems Interconnection—Systems management: Alarm reporting function.

ISO/IEC 10164-5:1993, Information technology—Open Systems Interconnection—Systems management: Event Report Management Function.

ISO/IEC 10165-1:1993, Information technology—Open Systems Interconnection—Management Information Services—Structure of management information: Management Information Model.

ISO/IEC 9595:1998, Information technology—Open Systems Interconnection—Common management information service.

ISO/IEC 9596-2:1993, Information technology—Open Systems Interconnection—Common management information protocol: Protocol Implementation Conformance Statement (PICS) proforma.

ISO/IEC 7498-4:1989, Information processing systems—Open Systems Interconnection—Basic Reference Model—Part 4: Management framework.

Gilbert R., et al., CNMGRAF—Graphic Presentation Services for Network Management, ACM 0-89791-164 (1985).

M. Gargano, et al., A Logical Data Model for Integrated Geographical Databases, IEEE (1990).

Micromuse's Netcool/Omnibus, A Cool MOM Makes It Easy, Data Communications, Jan. 1995.

Catania, V. et al., "Monitoring Performance in Distributed Systems", Computer Communications, Elsevier Science (1996).

Schlaerth, J., "A Concept for Tactical Wide-Area Network Hub Management" IEEE, (1994).

* cited by examiner

EVENT DATABASE MANAGEMENT METHOD AND SYSTEM FOR NETWORK EVENT REPORTING SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATIONS

This application is related to U.S. patent application Ser. No. 09/877,619, filed Jun. 8, 2001 and entitled "METHOD AND SYSTEM FOR EFFICIENT DISTRIBUTION OF NETWORK EVENT DATA,", which application is hereby incorporated herein by reference in its entirety.

BACKGROUND OF THE INVENTION

The invention disclosed herein relates generally to network monitoring systems. More particularly, the present invention relates to improved methods and systems for efficiently storing event data in a database and distributing the event data to different users, where the event data relates to events occurring on a computer network.

Maintaining the proper operation of services provided over a network is usually an important but difficult task. Service administrators are often called upon to react to a service failure by identifying the problem that caused the failure and then taking steps to correct the problem. The expense of service downtime, the limited supply of network engineers, and the competitive nature of today's marketplace have forced service providers to rely more and more heavily of software tools to keep their networks operating at peak efficiency and to deliver contracted service levels to an expanding customer base. Accordingly, it has become vital that these software tools be able to manage and monitor a network as efficiently as possible.

A number of tools are available to assist administrators in completing these tasks. One example is the NETCOOL® suite of applications available from Micromuse Inc. of San Francisco, Calif. which allows network administrators to monitor activity on networks such as wired and wireless voice communication networks, intranets, wide area networks, or the Internet. The NETCOOL® suite includes probes and monitors which log and collect network event data, including network occurrences such as alerts, alarms, or other faults, and store the event data in a database on a server. The system then reports the event data to network administrators in graphical and text based formats in accordance with particular requests made by the administrators. Administrators are thus able to observe desired network events on a real-time basis and respond to them more quickly. The NETCOOL® software allows administrators to request event data summarized according to a desired metric or formula, and further allows administrators to select filters in order to custom design their own service views and service reports.

In a demanding environment, there are many tens or even hundreds of clients viewing essentially the same filtered or summarized event data. Moreover, in a large network there are thousands of devices being monitored at a number of geographically distant locations, and events occur on these devices with great frequency. As a result, the databases that store event data have become very large and are constantly being updated. Newly incoming event data is delayed before being stored or processed at the database, e.g., during a period when the databases are locked. Even if such delays are for a fraction of a second or a few seconds, this may impair the ability of the administrator clients to receive event data in a timely manner. These and related issues become exacerbated as the size of a network increases, thus limiting the scalability of the network management system.

Accordingly, there is a need for improvements in how such network event databases are updated with events and how they are managed to provide greater scalability and efficiency. Furthermore, there is a need for improved techniques for efficiently coordinating the processing of event data obtained from both local and remote networks.

SUMMARY OF THE INVENTION

The present invention provides improved methods and systems for managing an event database in a network monitoring system. The improvements increase the efficiency in the way event data is handled by the database, increase the power and speed of the event database, and improve the scalability of the event database to allow it to serve a larger network. The improvements include methods for allowing users to set triggers to automatically pre-process event data received from monitored sites, a distributed system of local master and replica databases and methods for coordinating event data across them, and a notification subsystem for serving repeated client requests for raw and processed event data. These improvements work together to achieve improved performance as described herein.

Using the first aspect of the improvements, users are provided with the ability to add triggers into the event database. The triggers automatically test for certain event conditions, times, or database events, including system events or user-defined events including a name and selected parameter, and initiate a programmed action at the detection of such condition, time or event. One such trigger is a pre-processing trigger which examines event data before it is added to the event database, while still stored, e.g., in an event buffer or queue. One possible use of such a trigger is to prevent or reduce duplication of event data in the event database. That is, the same or duplicated event data may be reported from one or more monitors, and the pre-processing of the event data detects the occurrence of duplicate data through comparison to event data already stored in the event database or other event data also received for but prior to insertion in the event database. Preventing duplication keeps the event database streamlined and also limits the time in which the event database is in a lock down condition such as may be necessary during read/write operations.

Moreover, the invention efficiently provides event data from both local and remote monitoring locations using a system of local replicas and their unioning. Each monitoring location may maintain its own event data of local monitored sites, as well as a replica of event data stored at other, remote monitoring locations. Using a union or combining operating, the local and remote data can be combined to provide a unified event data summary for use by a client. The monitoring locations update one another when their event data changes.

The combination of the pre-processing triggers and the use of replicas and unioning provides substantially improved scalability of the network monitoring system. Since data in local event databases is propagated to corresponding replicas in remote locations, it is particularly advantageous to avoid or delay updating each local database table unless desired or necessary. The use of triggers helps achieve this selection before tying up each database.

The improved scalability and power of the event database is further achieved through a publish/subscribe notification method and software component. The notification component registers persistent client requests for filtered raw data or summary data, associates similar requests with one another, and delivers all corresponding requests at about the same time to all users who request the same or similar data. This allows for users to be efficiently updated on new event data without excessively tying up the event database.

A common thread in the use of triggers, especially pre-processing triggers, a union/replica architecture, and a publish/subscribe notification system is that they are all event-based methodologies. Triggers are activated by the occurrence of events, be they temporal or otherwise, and initiate actions on the events themselves, e.g., refusal to insert, or immediate communication to a client. The union/replica architecture moves away from a traditional database model and toward a model which focuses on where events are occurring and what locations they might affect. The notification model focuses on increased efficiency in delivering specific event data or event data metrics to clients requesting it. Shifting the focus of a network management system to the events occurring on the network results in the improvements in speed and efficiency described herein.

BRIEF DESCRIPTION OF THE DRAWINGS

The invention is illustrated in the figures of the accompanying drawings which are meant to be exemplary and not limiting, in which like references are intended to refer to like or corresponding elements, and in which.

DETAILED DESCRIPTION OF THE PREFERRED EMBODIMENTS

In accordance with the invention, methods and systems are described herein, with reference to the Figures, for providing pre-processing of event data, and efficient delivery of the event data to a number of clients. In particular, the description herein focuses on a network monitoring system in which data is captured relating to events such as faults or alarms occurring on a computer network and is distributed to a number of administrator clients responsible for monitoring the network and preventing or correcting such faults.

Figure 1:
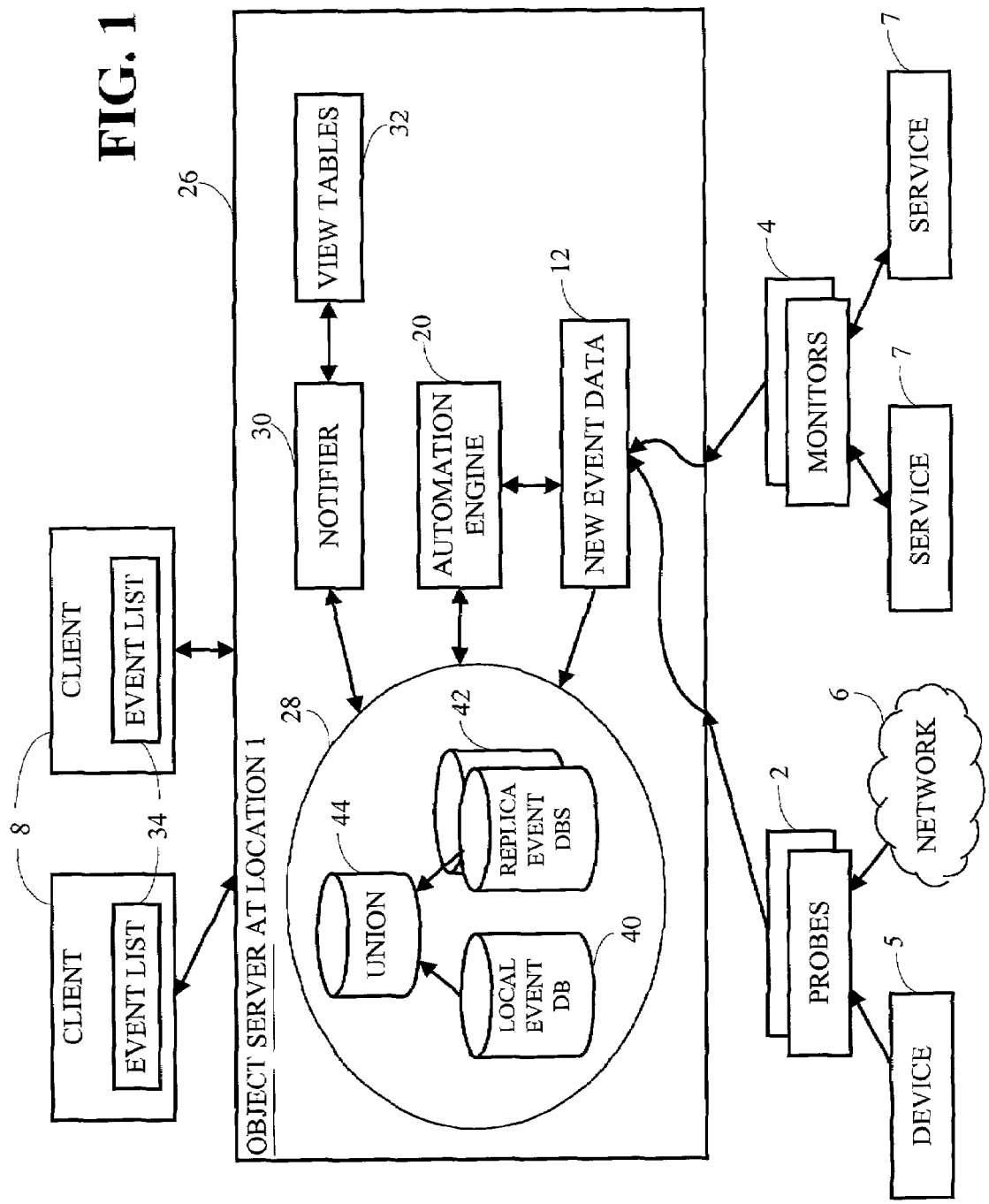
FIG. 1 is a block diagram showing functional components of an improved network monitoring system in accordance with one embodiment of the present invention.

FIG. 1 illustrates a network monitoring system in accordance with the present invention. The system includes an object server 26 which receives event data from a number of monitoring devices including probes 2 and monitors 4, stores the event data in one or more event databases 28, and provides the event data to a number of clients 8 which issue requests for the data. In one embodiment, the event databases 28 in the object server 26 are relational event databases 28 such as the Object Server database available as part of the NETCOOL®/Omnibus system available from Micromuse, Inc., San Francisco, Calif. Alternatively, the event database 28 may be any other suitable type of data store, such as an object-oriented database, flat file, etc. The event database 28 is a memory resident database, which is periodically dumped to file in case of failure. Events come in from probes 2 and monitors 4 in the form of SQL inserts. Clients 8 also access the database using SQL. As explained further below, the server is easy to configure, and has increased performance, functionality and flexibility.

The probes 2 are portions of code that collect events from network management data sources 6, APIs, databases, network devices 5, log files, and other utilities. Monitors 4 are software applications that simulate network users to determine response times and availability of services 7 such as on a network. Other monitoring devices may be used to collect and report on events occurring in the network or related devices or services.

The network management system monitors and reports on activity on a computer, telecommunications, or other type of network. In this context, clients 8 are typically administrators who make requests for event data which they need to monitor on a regular basis. Clients may elect to see all event activity on the network. More typically for larger networks, clients will only want to see event data occurring on particular parts of the network for which they are responsible or which may affect their portion of the network. In addition, clients may only want to see summaries of their relevant part of the event data, such as event counts, sums, averages, minimums, maximums, or other distributions of event data. Clients input the various requests into an event list 34, with each request representing and being sometimes referred to herein as a particular view on the data.

Event data is stored in the event database 28 of one embodiment in a number of rows and columns, with each row representing an event and the columns storing fields of data relating to the event, e.g., location, type, time, severity, etc. As used herein, then, a view is generally a mechanism for selecting columns from the database and may also optionally include a filter. A filter is generally a mechanism for excluding rows of data in the database based on column values. Views may therefore be based on filters. Filters may also be based on other filters and other views. A metric view is generally a type of view that provides summary information on the number of rows in a view rather than the actual data, and usually requires some arithmetic processing on the number of rows.

These client requests or views are persistent and are delivered according to a publish/subscribe model. That is, because network events occur regularly, the data in the event database 28 changes frequently and clients must be informed promptly of the updates in accordance with their specified requests to be able to make proper use of the data. The object server 26 processes the standing requests at a set frequency, e.g., every five or ten seconds, and delivers the results to the clients in the form of a stream or event data which is new or updated since the requests were last processed. The default or initial frequency for processing standing requests may be preset to any desired time frequency in any desired time units, e.g., seconds or portions thereof, minutes, hours, etc., and in any desired amount.

Regarding communications used at the object server 26, features of the present invention include event list optimization, replicas 42 and unions 44, and clusters. For event list optimization, a typical installation has many users with the same event lists. This is a significant cause of load at the server. Approaches include evaluating a view once, then publishing the results on the bus, and using throttling to prevent overload. A replica comprises a cached copy of a remote table. Inserts, updates, and deletes are passed to the master copy of a replica. A union is a set of tables and replicas, which are presented as a single table. Replicas and unions are discussed further below. Clusters are described in the above referenced commonly owned pending application Ser. No. 09/877,619.

In accordance with one aspect of the invention, a notification program or notifier 30 is provided which manages the client requests for data from the object server 26 to efficiently distribute the responses to the client requests. The notification program 30 may be part of the object server 26 as shown or may be a separate, standalone component of the system. In accordance with processes described in greater detail in the above referenced commonly owned pending application Ser. No. 09/877,619, the notification program 30 manages the various client requests in a view list or table 32 having a number of request sets. Each request set relates to a specific type of view or data filter and may include a number of metrics or formulas which summarize data in the object server 26 and which are requested to be processed by or for clients 8.

When the notifier 30 receives a registration request from a client 8, it scans its list of existing registrations. If, as in this example, an identical registration already exists, the second registration is associated with the first. The first registration of particular summary data may be referred to as a "primary" registration or request, whereas subsequent registrations of identical summary data may be referred to as "secondary" registrations or requests. The notifier 30 periodically scans its list of primary registrations, and for each it calculates the summary data, and sends the results to all clients that have registered interest in that data. Thus, when a client 18 elects a metric view in its event list 34, the notifier 30 registers interest in that metric view with the view table 32 in the object server 26. If another client elects to view the same metric view, the notifier 30 also registers that other client's interest in the summary data in the view table 32.

As a result, this notification program 30 and view list library 32 optimizes the evaluation of summary data. Specifically, assuming that each client requests views of the same M metrics, the work done by the object server 26 is of the order of M, rather than M*(number of clients).

Further in accordance with the invention, an automation engine 20 is provided as part of the object server 26. The automation engine 20 involves the use of "triggers" to allow an administrator to connect events, conditions and actions together. The object server 26 provides the automation module with events, triggers and actions that are fully general to support many enhancement requests as well as debugging support wherein individual triggers can be put into debug mode, and debugging entries are written to a log file.

Much of the power of the object server 26 comes from automation. Automation allows the system to respond to events, i.e., happenings of interest such as the modification of data in a table, execution of a command, or the passing of a time interval. When an event occurs, a query is executed, and then a condition is evaluated, which if true causes the execution of an action: e.g., a sequence of SQL statements, an external script, or both. Moreover, each trigger has a coupling mode that indicates when the action should be executed, i.e., now or at some later time. Triggers may be created, altered, or dropped. The SQL command syntax for implementing triggers in one embodiment of the invention is summarized in the Appendix, which forms a part hereof.

Triggers allow actions to be executed when some event of interest occurs. The triggering event may be a primitive event, a database event, or a temporal event, for example. When the event occurs, an optional evaluate clause is executed, and then a condition is evaluated, and, if true, the action is executed. A primitive event is some happening of interest assigned a unique name. On occurrence, all events carry a set of arguments, which includes zero or more <name, type> pairs. The classes of primitive events include a user class for an event created by a user and a system class for some interesting occurrence in the object server, e.g. a user has logged in, the license is about to expire, etc.

Regarding user events, these may include user-defined events. Moreover, a user event may be created at a command line: e.g. create event bob (a INT, b REAL). A user event may be raised at the command line: e.g. raise event bob 1, 1.2.

Temporal triggers signal an event at a determined frequency from a specified absolute time until a specified absolute time.

Figure 2:
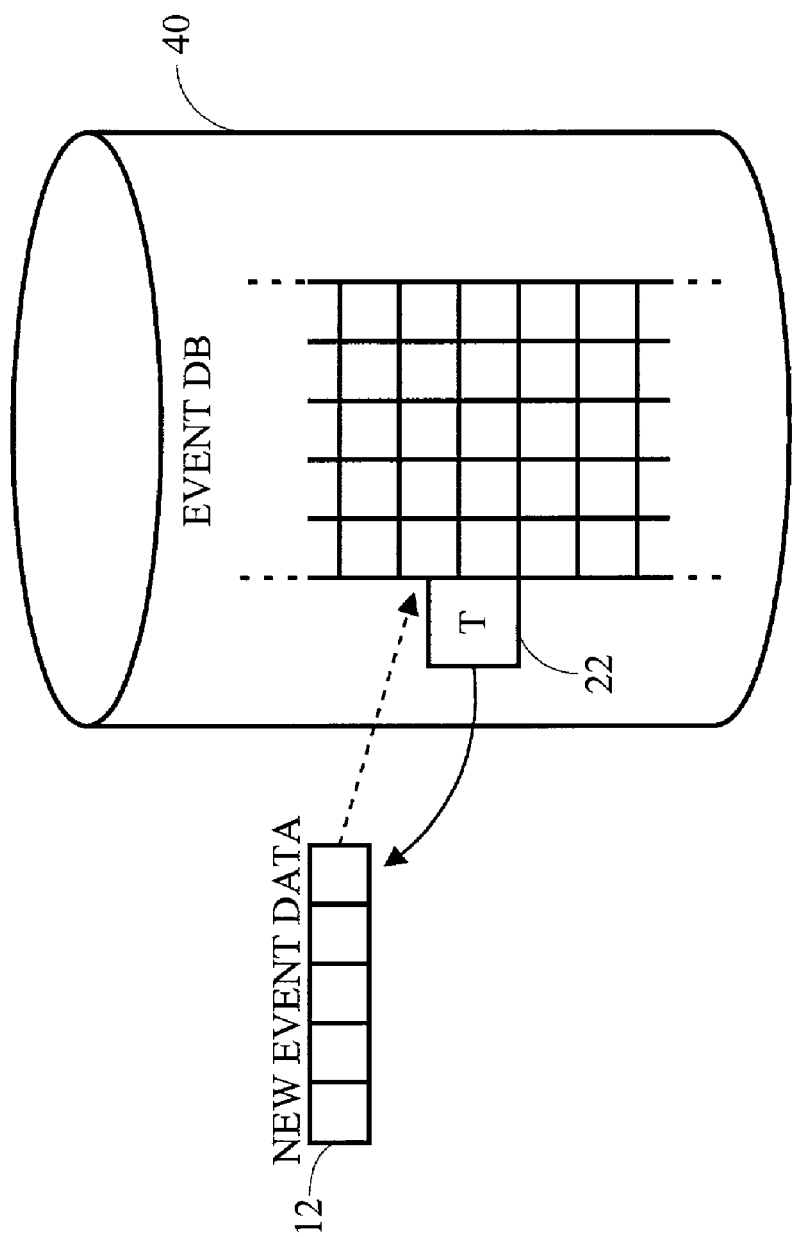
FIG. 2 is a flow diagram showing the pre-processing of event data in accordance with one embodiment of the present invention.

In accordance with an aspect of the invention, triggers may be inserted into the database to handle processing of event data before it gets added to the database. The object server receives raw event data from monitored sites in the network, e.g., via monitoring devices 2, 4. The raw event data is buffered in buffer 12, and pre-processed by the automations engine 20 prior to being stored in a database. FIG. 2 shows this process schematically, wherein trigger 22 reads event data in buffer 12 before it is inserted into event database table 40. Advantageously, the event data 12 can be processed even while the database is in a read/write lockdown condition, e.g., when the database is being updated and cannot perform read or write operation from or to external devices. This avoids delays in processing the event data and communicating corresponding messages to the clients via a notifier.

An EECA model is used for triggers: event, evaluate, condition, action. When an event occurs, execute evaluate, then test the condition, and if true execute action. Transition tables may be used to communicate results between phases of a trigger. Procedural SQL syntax in actions may be used. Following are several exemplary types of triggers which may be used.

An "up-down correlation" temporal trigger may be described as follows:

NAME up-down correlation

EVENT every 10 seconds

EVALUATE select Node from alerts.status where . . . bind as tt

CONDITION when % row_count>0

ACTION
    for each row r in tt
    update alerts.status set . . . where Node=r.Node A "PageOnRouterDown" temporal trigger may be described as follows.

NAME PageOnRouterDown

EVENT every 10 seconds

EVALUATE select * from alerts.status where . . . bind as tt

CONDITION true

ACTION
   if % trigger.row_count>0 AND (% trigger.positive_row_count mod 5)=0
     system(/usr/bin/page_message 'some routers are down')
   end if
   if % trigger.row_count=0 AND (% trigger.zero_row_count mod 5)=0
     system(/usr/bin/page_message 'no routers are down')
   end if An example database trigger which preprocesses new event data to avoid duplication of event data in the event database is described as follows.

NAME deduplication

EVENT before reinsert on alerts.status

EVALUATE <nothing>

CONDITION true

ACTION
   set old.Tally=old.Tally+1,
   set old.Summary=new.Summary
   set old.LastOccurrrence=new.LastOccurrence An example event trigger may be described as follows.

NAME ConnectionWatch

EVENT on event connect

EVALUATE <nothing>

CONDITION true

ACTION
   insert into alerts.status . . . % event.user, % event,time

Figure 3:
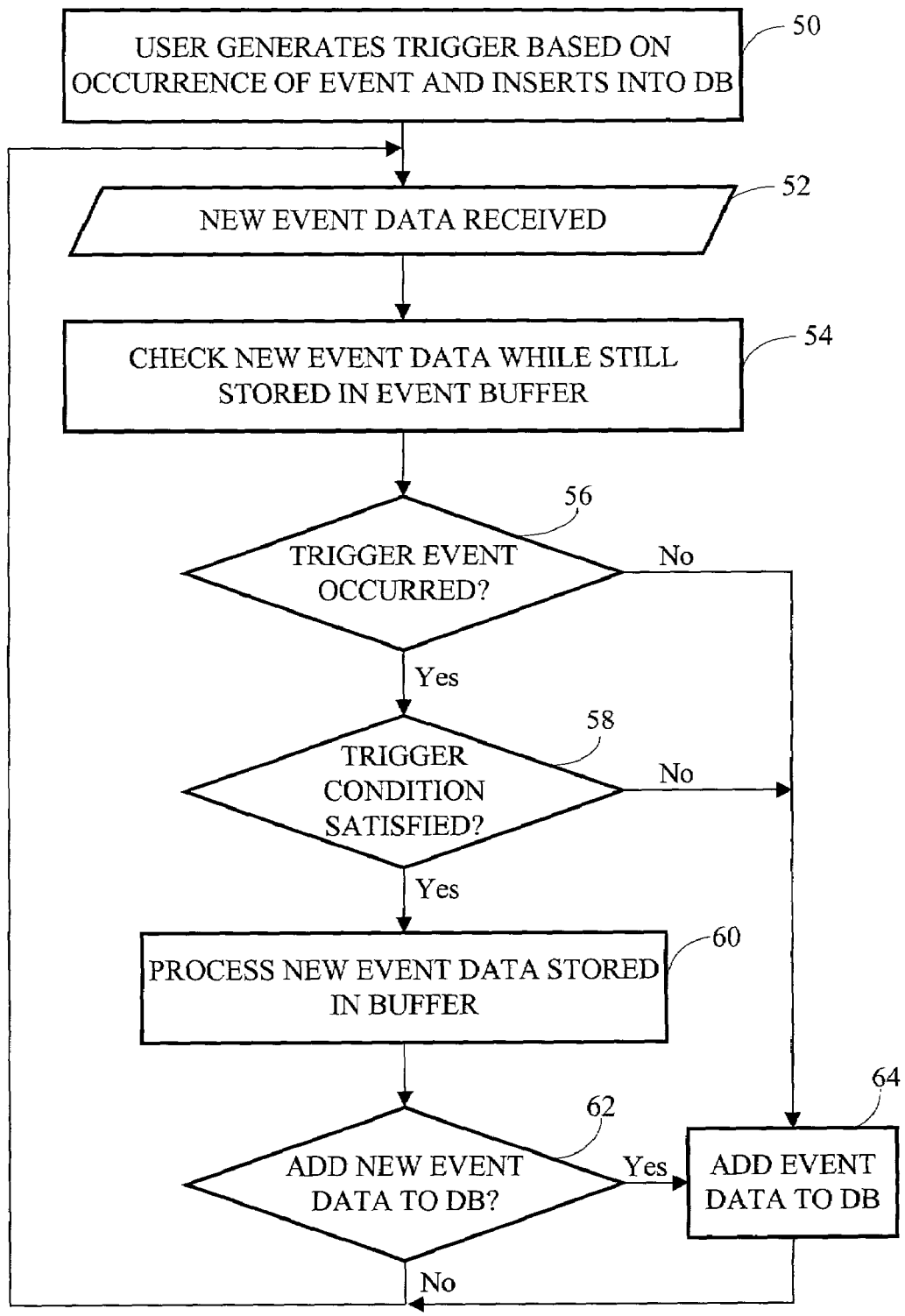
FIG. 3 is a flow chart showing a process of using a trigger to pre-process event data in accordance with one embodiment of the present invention.

Referring to FIG. 3, a process of using triggers to preprocess event data such as in a deduplication trigger is as follows. A user generates the trigger based on a desired event and inserts it into the database, step 50. When new event data is received, step 52, it is checked by the trigger while still stored in the event buffer and before added to the database, step 54. If the event defined by the trigger has occurred, step 56, e.g., is represented by the event in the new event data, the trigger test to see if any user-defined condition(s) is satisfied, step 58. If so, the new event data is processed in accordance with the action specified in the trigger, step 60. For this purpose, the trigger generates a transition table, i.e., an anonymous table used by the action in the trigger, and uses one or more transition variables, i.e., variables generated by a database trigger and used by an action. If the action in the trigger involves deleting the new event data or otherwise avoiding or delaying insertion of the new event data into the event database, step 62, the new event data is not added. Otherwise, or when the trigger action is not invoked, the event data is added to the event database, step 64.

Referring again to FIG. 1, in accordance with another aspect of the present invention, the event database 28 is distributed into local event databases 40 storing event data generated by a given location on the network and one or more replica event databases 42 storing event data gathered at and replicated from one or more remote network locations. When delivering on client requests, a union 44 is generated by combining the local and remote databases 40, 42, using commonly known unioning techniques.

Figure 4:
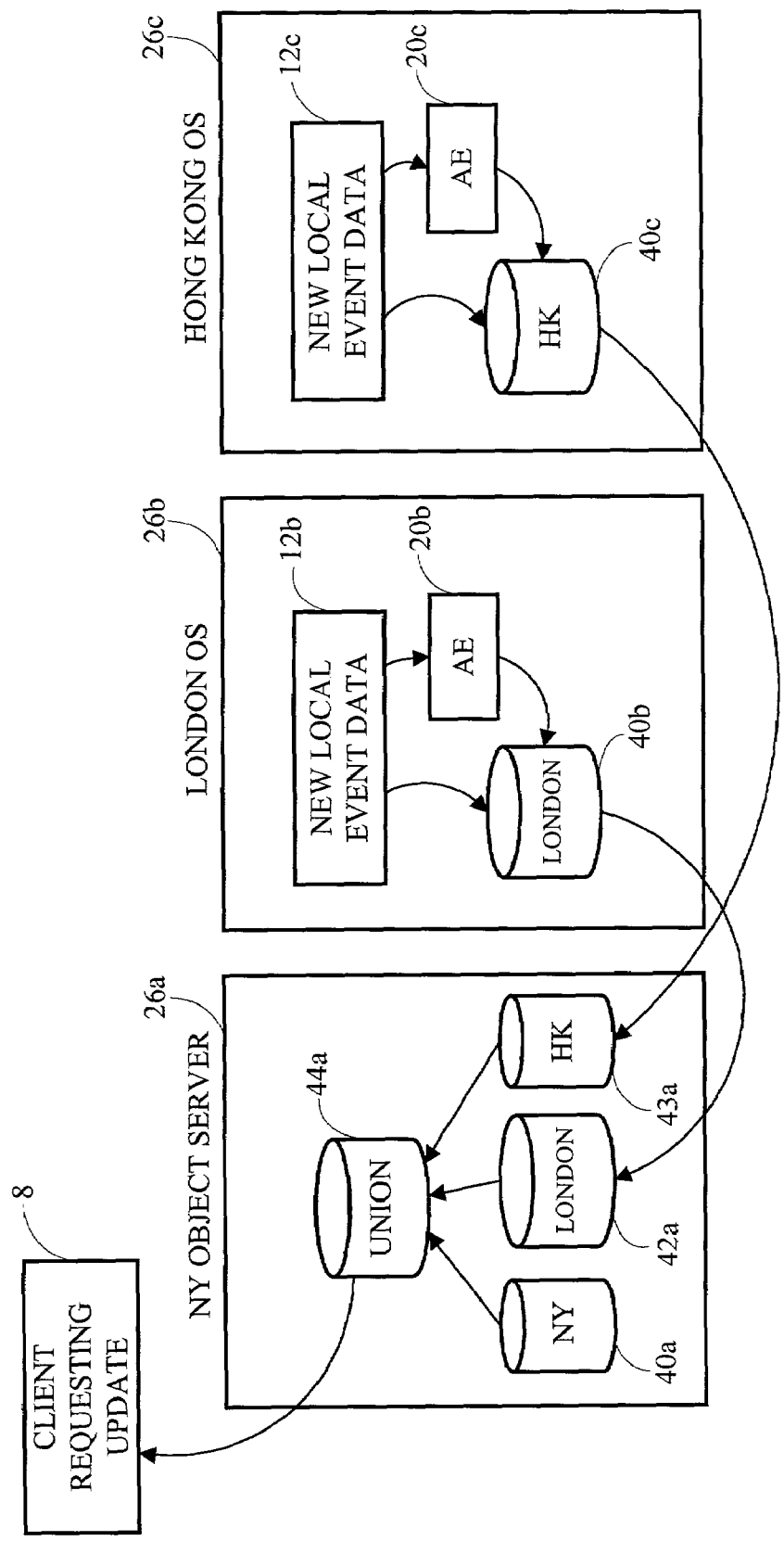
FIG. 4 is a flow diagram showing a process of managing local and replicas of event databases in accordance with one embodiment of the present invention.

For example, referring to FIG. 4, a distributed implementation is shown with one object server in London 26b, one in Hong Kong 26c, and another in New York 26a. Each object server 26a, 26b, 26c is configured to have a single table 40a, 40b, 40c, respectively, that holds locally generated alarms, and a replica of the table maintained by the other object server. So, for example, the New York local database table 40a holds locally generated alarms or other events in a table called alerts.NY, and has replicas of remotely generated alarms or other events in alerts.LN 42a and alerts.HK 43a. In addition it has a union 44a called alerts.status which logically contains alerts.HK, alerts.LN, and alerts.NY. A modification made to a local table is applied directly by that table. A modification to a replica normally requires the modification to be written through to its owner, e.g., an update of every row in alerts.status in Hong Kong results in a message being sent to New York requesting that the rows of alerts.NY held there be updated.

However, it is possible for a local monitoring location to take ownership of a replica, so that subsequent modifications to it do not require "writing through" to its owner that is, without receiving instructions from the remote monitoring location associated therewith. This allows "follow-the-sun" configurations to be built, in which each local monitoring station controls updating of local and replica tables during its primary time period of operation, and then passes control at the end of this period to another location in a different time period which then assumes control for its given time period of business operations.

Thus, in accordance with the invention, a replica represents a copy of a table held on a remote object server and is incrementally updated to reflect the state of the table at the owning site. Attempts to modify data held in a replica result in a command being sent to the master copy of the table requesting the modification. A site holding a replica can become the owner if necessary. The attributes of a replica include its unique name in each database and its storage class (persistent or temporary). Attempts to modify data held in a union result in the command being applied to each of its components in an implementation-defined order. The attributes of a union include its unique name in each database and its storage class (persistent or temporary). Unions are created through specification of the names of the tables and replicas, and may be altered through the addition or removal of a table or replica.

Figure 5:
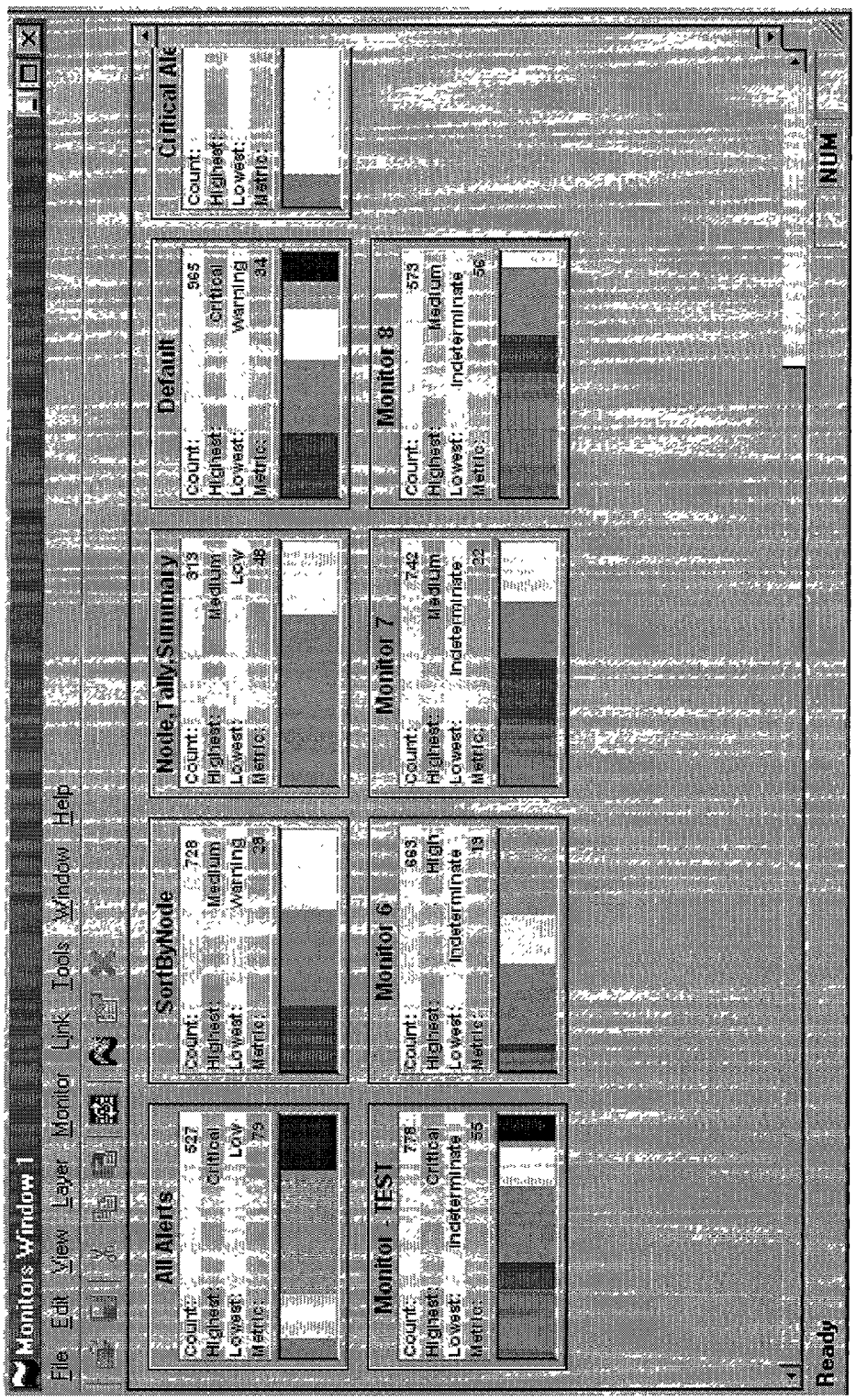
FIG. 5 illustrates a client display with an ordered view in accordance with one embodiment of the present invention.
Figure 6:
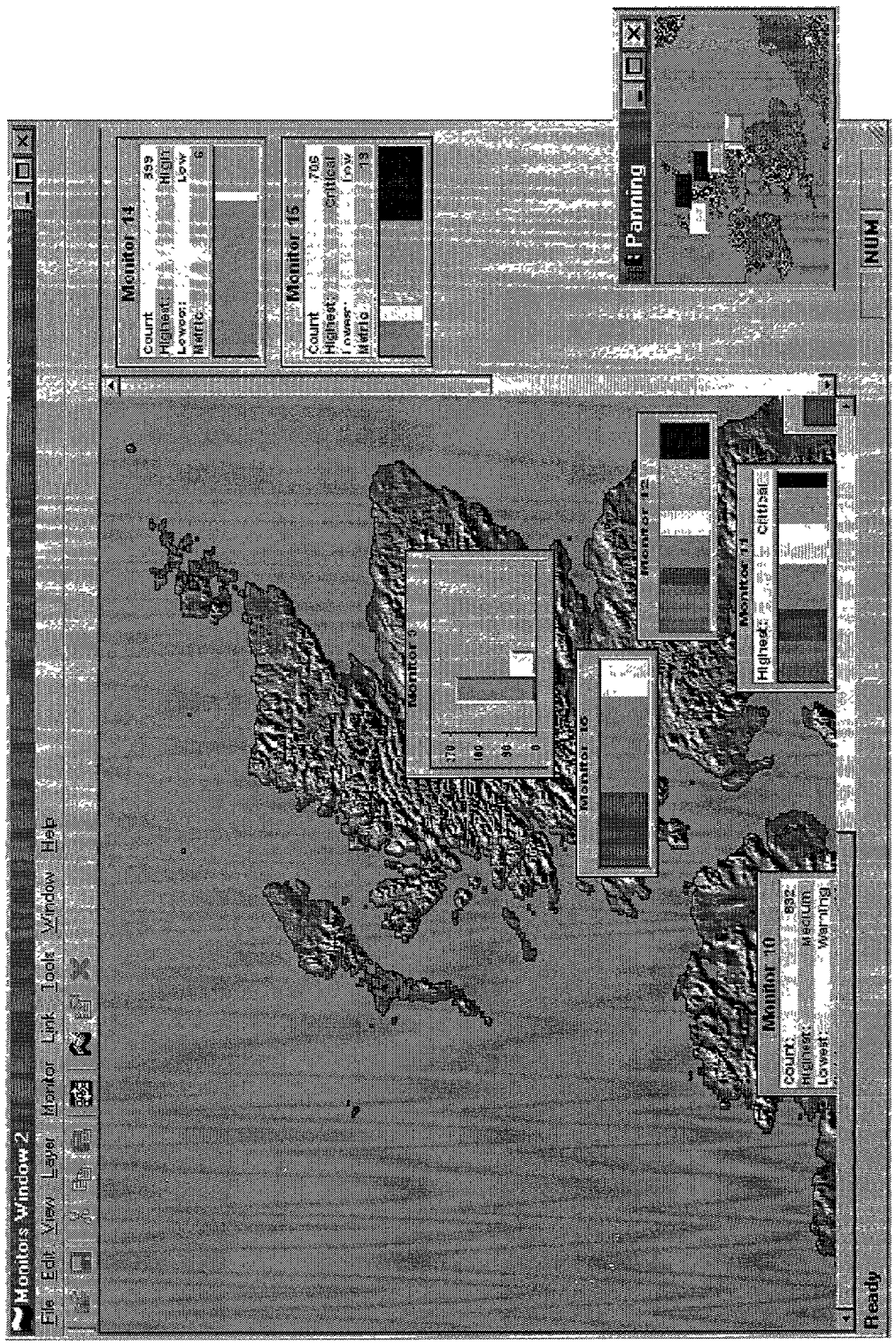
FIG. 6 illustrates a client display with a map/geographical view in accordance with one embodiment of the present invention.
Figure 7:
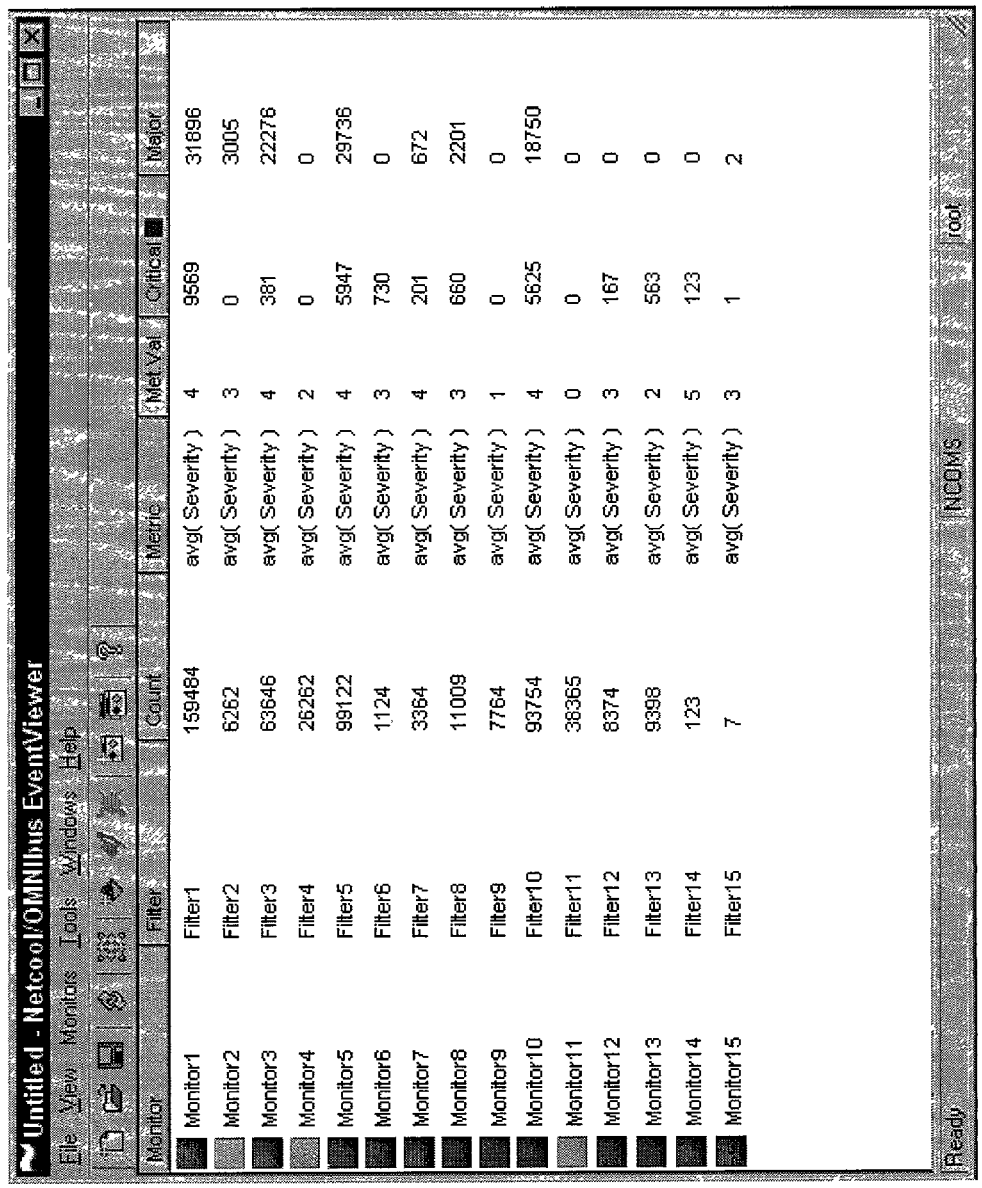
FIG. 7 illustrates a client display with a list view in accordance with one embodiment of the present invention.

The features described herein of the present invention support a powerful, scalable, and fast system for delivering network event data to clients using many different client views. Three exemplary views are shown in FIGS. 5-7. FIG. 5 illustrates a client display with an ordered view in accordance with one embodiment of the present invention. The display is generated at the client location in response to the event data communicated to it by the server. Both pure and metric views are shown (referred to as monitors in the screen displays, which refer to client-generated monitors and not specific monitor devices such as monitors or probes which collect data from specific networks, services, or devices), and the user can reorder views by drag and drop. Links appear as views. Moreover, a background image/pattern can be added.

FIG. 6 illustrates a client display with a map/geographical view in accordance with one embodiment of the present invention. The display may also be generated at the client location in response to the event data communicated to it by the server, and provide event information arranged geographically. Users can reposition views by drag and drop, resize views by dragging edges, add a link by selecting monitors to link, or add a background map. New monitors created in ordered view appear in unplaced palette.

FIG. 7 illustrates a client display with a list view in accordance with one embodiment of the present invention. This view provides event data based on the monitor. In particular, monitor information is displayed as a detailed list. One can sort on each column by selecting the column header.

Generally, the event data that is communicated to the client location may be presented in a variety of forms to suit the clients' needs.

Accordingly, it can be seen that the present invention provides improved and more efficient techniques for reducing the amount of work that needs to be performed by a database in a computer network in order to distribute event summary data to a large number of administrator clients. Moreover, the invention avoids or reduces delays experienced by event data at a database, e.g., due to delays in accessing a database. Furthermore, event data obtained from both local and remote networks is efficiently coordinated using replica and union processes. Each monitoring location in the network includes both locally generated events, and a copy of remotely-generated events which are provided and maintained by one or more remote monitoring locations.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

APPENDIX

SQL Command Syntax Summary

Triggers
CREATE [OR REPLACE] TRIGGER <name> // temporal triggers
   [DEBUGGING <bool>]
   [ENABLED <bool>]
   PRIORITY <int> // 1=min, 20=max
   [COMMENT <text>]
   [FROM <abs_time>] [UNTIL <abs_time>] EVERY <rel_time>
   [EVALUATE <select> BIND AS <name>]
   [WHEN <condition>]
   EXECUTE IMMEDIATE|DEFERRED|DETACHED
   DECLARE
      <decls>
   BEGIN
      <action>
   END
CREATE [OR REPLACE] TRIGGER <name> // database triggers
   [DEBUGGING <bool>]
   [ENABLED <bool>]
   PRIORITY <int> // 1=min, 20=max
   [COMMENT <text>]
   BEFORE|AFTER
   INSERT|UPDATE|DELETE|REINSERT
   ON <table>
   FOR EACH {ROW|STATEMENT}
   [EVALUATE <select> BIND AS <name>] // for STATEMENT triggers
   [WHEN <condition>]
   EXECUTE IMMEDIATE|DEFERRED|DETACHED
   DECLARE // pre-triggers must be immediate
      <decls>
   BEGIN
      <action>
   END
CREATE [OR REPLACE] TRIGGER <name> // event triggers
   [DEBUGGING <bool>]
   [ENABLED <bool>]
   PRIORITY <int> // 1=min, 20=max
   [COMMENT <text>]
   ON EVENT <name>
   [EVALUATE <select> BIND AS <name>]
   [WHEN <condition>]
   EXECUTE IMMEDIATE|DEFERRED|DETACHED
   DECLARE
      <decls>
   BEGIN
      <action>
   END
ALTER TRIGGER <name>
   SET DEBUG <boolval>
   SET ENABLED <boolval>
   SET PRIORITY <int>
DROP TRIGGER <name>

Trigger Attributes

These are read-only scalar values accessible in WHEN and action blocks

% trigger.row_count number of rows matched in evaluate clause

% trigger.last_condition value of condition on last execution

% trigger.num_executions number of times trigger has been run

% trigger.num_fires number of executions where condition was true

% trigger.num_zero_row_count number of consecutive fires with zero matches in eval % trigger.num_positive row_count number of consecutive fires with >0 matches in eval

What is claimed is:

1. A method for providing an improved network monitoring system, the network monitoring system comprising an event database for storing event data representing events occurring on the network, the event data being gathered by a plurality of monitoring devices located at a plurality of different, remote locations on the network, the method comprising:

allowing users to insert one or more triggers into the event database, the triggers automatically initiating a programmed response at the detection of an event including gathered event data prior to insertion of the gathered event data into the event database, the event is one of a primitive event, a database event or a temporal event;

distributing the event database to a plurality of remote network locations, wherein each remote network location stores a local table containing event data generated at the remote location and one or more replica tables containing event data generated at other remote locations, and wherein a union of the local and replica tables is generated to form a combined event database at the remote location; and using triggers and local and replica table unions during delivery of event data to users of the network monitoring system wherein the local and replica tables update one another when the event data of one of said tables changes.

2. The method of claim 1, comprising providing a notification component for registering similar client requests for event data and substantially contemporaneously delivering requested event data to all clients having similar registered requests.

3. An event database for use in a network monitoring system, the event database storing event data representing events occurring on the network, the event data being gathered by a plurality of monitor devices located at a plurality of different, remote locations on the network, the event database comprising:

an automation engine for processing one or more triggers contained in the event database, the triggers automatically initiating a programmed response at the detection of an event including on gathered event data prior to insertion of the gathered event data into the event database, the event is one of a primitive event, a database event or a temporal event;

a local table stored at each remote network location containing event data generated at the remote location;

one or more replica tables stored at each remote network location containing event data generated at other remote locations, wherein a union of the local and replica tables is generated to form a combined event database at the remote location, and wherein the local and replica tables update one another when the event data of one of said tables changes.

4. A method for handling event data from monitored sites in a computer network, comprising:

receiving event data from the sites at a monitoring location;

when received at the monitoring location, pre-processing the event data before the event data is inserted into an event database to determine if an event is met as set forth in a trigger;

if the trigger event is met, initiating an action relating to the event data, the action being defined in the trigger, the event is one of a primitive event, a database event or a temporal event;

inserting the event data into the event database thereby producing central data; and transmitting the central data to each of the monitored sites;

wherein each of the monitored sites includes locally-generated event data and a replica of the central data;

wherein a union of the locally-generated event data and the central data is formed at each of the monitored sites; and wherein the monitored sites update one another when the event data of one of said monitored sites changes.

5. The method of claim 4, wherein pre-processing the event data comprises determining whether the event data comprises a duplication of other event data in the event database or received at the monitoring location.

6. The method of claim 5, wherein initiating the action comprises denying storage of the event data in the event database if it comprises a duplication of other event data.

7. The method of claim 4, wherein if the event data does not meet the event, it is temporarily stored outside the data store.

8. The method of claim 4, wherein for event data received at the monitoring location, a query is executed, and an event is evaluated, which, if true, causes the execution of the action.

9. The method of claim 8, wherein the action comprises at least one of a sequence of Structured Query Language (SQL) statements and an external script.

10. The method of claim 4, wherein the trigger has a coupling mode that indicates when the action should be executed.

11. The method of claim 4, wherein the trigger allows an administrator of the network to connect events, conditions and actions.

12. The method of claim 4, wherein the event data comprises a primitive event.

13. The method of claim 4, wherein the event data comprises a database event.

14. The method of claim 4, wherein the event data comprises a temporal event.

15. The method of claim 4, wherein the trigger comprises a database trigger.

16. The method of claim 4, wherein the trigger comprises a temporal trigger.

17. The method of claim 16, wherein the temporal trigger signals an event at a determined frequency from a specified start time until a specified end time.

18. The method of claim 4, wherein initiating an action comprises communicating a message in accordance with the event data to at least one customer location that has subscribed to receive the event data, and storing the event data in a data store at the monitoring location.

19. The method of claim 18, wherein the pre-processing occurs, at least in part, during a period when the data store is inaccessible.

20. The method of claim 18, wherein the message communicated in accordance with the event data is included in the union of at least event data of a local network and event data of a remote network.

21. The method of claim 20, wherein the union comprises a union of event data tables.

22. The method of claim 4, wherein the monitoring locations update one another with their event data.

23. The method of claim 4, wherein at least one monitoring location is enabled to take ownership of a replica of remotely-generated event data to make modifications thereto without instructions from the remote monitoring location associated therewith.

24. A system for handling event data from monitored sites in a computer network, comprising:

means for receiving event data from the sites at a monitoring location;

means for pre-processing the event data, when received at the monitoring location, to determine if a condition is met for setting a trigger;

means for communicating a message, if the trigger is set, in accordance with the event data to at least one customer location that has subscribed to receive the event data, and storing the event data in a data store at the monitoring location, the trigger being in response to a primitive event, a database event or a temporal event;

means for inserting the event data into the event database thereby producing central data; and means for transmitting the central data to each of the monitored sites;

wherein each of the monitored sites includes locally-generated event data and a replica of the central data;

wherein a union of the locally-generated event data and the central data is formed at each of the monitored sites; and wherein the monitored sites update one another when the event data of one of said monitored sites changes.

* * * * *